US010995008B2

(12) United States Patent
Kalo et al.

(10) Patent No.: US 10,995,008 B2
(45) Date of Patent: May 4, 2021

(54) PROCESS FOR THE FLASH CALCINATION OF A ZEOLITIC MATERIAL

(71) Applicant: BASF SE, Ludwigshafen am Rhein (DE)

(72) Inventors: Benedikt Kalo, Mannheim (DE); Thomas Geiger, Roemerberg (DE); Rene Koenig, Neustadt (DE); Ulrich Mueller, Neustedt (DE); Stefan Maurer, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 303 days.

(21) Appl. No.: 16/086,251

(22) PCT Filed: Mar. 22, 2017

(86) PCT No.: PCT/EP2017/056855
§ 371 (c)(1),
(2) Date: Sep. 18, 2018

(87) PCT Pub. No.: WO2017/167622
PCT Pub. Date: Oct. 5, 2017

(65) Prior Publication Data
US 2020/0290884 A1    Sep. 17, 2020

(30) Foreign Application Priority Data

Mar. 30, 2016 (EP) .................................... 16162900

(51) Int. Cl.
*C01B 39/00*   (2006.01)
*C01B 39/02*   (2006.01)
*B01J 29/70*   (2006.01)
*B01J 37/00*   (2006.01)
*B01J 37/06*   (2006.01)
*C01B 39/48*   (2006.01)
*C01B 39/04*   (2006.01)
*B01D 15/36*   (2006.01)
*B01D 71/02*   (2006.01)
*B01J 6/00*    (2006.01)
*B01J 20/18*   (2006.01)
*B01J 29/00*   (2006.01)

(52) U.S. Cl.
CPC ......... *C01B 39/026* (2013.01); *B01J 29/7015* (2013.01); *B01J 37/0045* (2013.01); *B01J 37/06* (2013.01); *C01B 39/04* (2013.01); *C01B 39/48* (2013.01); *B01D 15/361* (2013.01); *B01D 71/028* (2013.01); *B01J 6/001* (2013.01); *B01J 20/183* (2013.01); *B01J 29/00* (2013.01); *C01P 2004/61* (2013.01); *C01P 2004/62* (2013.01)

(58) Field of Classification Search
CPC ....... C01B 39/026; C01B 39/04; C01B 39/48; B01J 6/004; B01J 20/183; B01J 29/00; B01J 37/0045; B01J 37/06; B01J 29/7015; C01P 2004/61; C01P 2004/62
See application file for complete search history.

(56) References Cited

U.S. PATENT DOCUMENTS

| 3,862,294 | A | * | 1/1975 | Engelhart ................. C04B 2/12 423/155 |
| 4,410,501 | A | * | 10/1983 | Taramasso ............... B01J 29/89 423/705 |
| 5,500,199 | A | * | 3/1996 | Bellussi ............... C01B 35/1009 423/328.2 |
| 6,106,803 | A | | 8/2000 | Hasenzahl et al. |
| 6,620,820 | B2 | | 9/2003 | Wehner et al. |
| 2007/0027347 | A1 | * | 2/2007 | Miller .................. C07D 303/04 568/959 |
| 2009/0192323 | A1 | | 7/2009 | Morales et al. |

FOREIGN PATENT DOCUMENTS

EP    2 599 748 A1    6/2013

OTHER PUBLICATIONS

International Search Report dated Jun. 2, 2017 in PCT/EP2017/056855.
International Preliminary Report on Patentability and Written Opinion dated Oct. 11, 2018 in PCT/EP2017/056855.
Zhendong Guo, et al., "Aerosol-assisted synthesis of hierarchical porous titanosilicate molecular sieve as catalysts for cyclohexene epoxidation", Journal of Porous Materials, vol. 23, No. 2, XP035918858, 2016, pp. 407-413.
Olga Prokopova, et al., "Principal Features of Tetrapropylammonium Hydroxide Removal Kinetics from Silicalite-1 in Quasi-isothermal Heating Regimes", Journal of Physical Chemistry C, vol. 117, 2013, pp. 1468-1476.
V. R. Choudhary, et al., "Influence of decomposition conditions of TPA-ZSM-5 on surface and catalytic properties of the resulting H•Na-ZSM-5", Journal of Catalysis, vol. 94, 1985, pp. 573-575.
Stephen A. Bagshaw, et al., "Rapid calcination of high quality mesostructured MCM-41, MSU-X, and SBA-15 silicate materials: A step towards continuous processing?", Microporous and Mesoporous Materials, vol. 109, 2008, pp. 199-209.

(Continued)

*Primary Examiner* — David M Brunsman
(74) *Attorney, Agent, or Firm* — Lowenstein Sandler LLP

(57) ABSTRACT

A process for the calcination of a zeolitic material, wherein the process contains the steps of (i) providing a zeolitic material containing $YO_2$ and optionally further containing $X_2O_3$ in its framework structure in the form of a powder and/or of a suspension of the zeolitic material in a liquid, wherein Y stands for a tetravalent element and X stands for a trivalent element; (ii) atomization of the powder and/or of the suspension of the zeolitic material provided in (i) in a gas stream for obtaining an aerosol; and (iii) calcination of the aerosol obtained in (ii) for obtaining a calcined powder, a zeolitic material obtained by the above process, and its use as a molecular sieve, as an adsorbent, for ion-exchange, as a catalyst, and/or as a catalyst support.

14 Claims, No Drawings

(56) References Cited

OTHER PUBLICATIONS

Karine Assaker, et al., "Mesoporous titania with anatase walls by flash induction calcination", Microporous and Mesoporous Materials, vol. 201, 2015, pp. 43-49.

Taissire Benamor, et al., "Flash induction calcination: A powerful tool for total template removal and fine tuning of the hydrophobic/hydrophilic balance in SBA-15 type silica mesoporous materials", Microporous and Mesoporous Materials, vol. 147, 2012, pp. 334-342.

The-Long Lai, et al., "Rapid removal of organic template from SBA-15 with microwave assisted extraction", Materials Letters, vol. 63, 2009, pp. 1693-1695.

Karl W. Gallis, et al., "Rapid calcination of nanostructured silicate composites by microwave irradiation", Advanced Materials, vol. 13, No. 1, 2001, pp. 23-26.

Joel Patarin, "Mild Methods for Removing Organic Templates from Inorganic Host Materials" Angewandte Chemie Int Ed, vol. 43, No. 30, XP055725119, Jul. 26, 2004, pp. 3878-3880.

\* cited by examiner

PROCESS FOR THE FLASH CALCINATION OF A ZEOLITIC MATERIAL

This application is a 371 filing of PCT/EP2017/056855, filed Mar. 22, 2017.

The present invention relates to a process for the preparation of a calcined zeolitic material as well as to a calcined zeolitic material obtainable from the inventive process and in particular from flash calcination. Furthermore, the present invention relates to the use of a calcined zeolitic material obtainable according to the inventive process.

Introduction

In the field of zeolite chemistry, the workup of synthesized zeolites typically involve steps of washing and drying the crystalline products obtained, followed by a calcining treatment wherein the product is heated to temperatures typically in the range of from 500 to 650° C. Said calcination treatment often completes the zeolite synthesis by involving a certain degree of modification in the framework structure and in particular in the microporous system contained therein such that the final product is typically obtained after completion thereof. This applies in particular for zeolitic materials obtained with the assistance of a structure directing agent and in particular with the aid of an organotemplate compound which remains trapped zeolitic micro pores even after washing and drying thereof. In these cases, the calcination further leads to the thermal decomposition and/or combustion of such organic compounds trapped within the zeolitic framework such as to allow free access to the entire microporous system in the final product.

To this effect, zeolites are conventionally calcined in rotary ovens. The retention time of the particles in rotary ovens normally lies around 20 to 45 minutes, wherein the retention time refers to the time spent by the particles in the relevant hot zone thereof. The temperature of the rotary calciner usually lies around 500 to 650° C. As regards the calcination of zeolites for removal of organic compounds contained therein and in particular the removal of organotemplates, this may be performed in an oxidizing environment wherein calcination is typically performed under air.

As regards the calcination step, efforts have been made to increase its efficiency. Thus, the calcination procedure as such has been studied and short calcination procedures have for example been investigated for reducing the time required for obtaining the final product. By way of example, Prokopova, O. et al. "Principal Features of Tetrapropylammonium Hydroxide Removal Kinetics from Silicalite-1 in Quasi-isothermal Heating Regimes" in J. Phys. Chem. C 2013, 117, pages 1468-1476 concerns a theoretic study of the time dependency of tetrapropyl ammonium hydroxide removal from unconsolidated silicalite-1 crystal layers involving a duration of calcination of 7 to 8 hours.

Choudhary, V. R. et al. "Influence of decomposition conditions of TPA-ZSM-5 on surface and catalytic properties of the resulting H.Na-ZSM-5" in Journal of Catalysis 1985, 94, 573-575 concerns a study on the influence of decomposition conditions on tetrapropyl ammonium cations occluded in the structure of ZSM-5 zeolite, wherein the specific experiments involve the calcination of the materials at 813 K for 18 hours.

Bagshaw, S. A. "Rapid calcination of high quality meso-structured MCM-41, MSU-X, and SBA15 silicate materials: A step towards continuous processing?" in Mesoporous Materials 2008, 109, pages 199-209 relates to the rapid calcination of silicate meso structures involving heat rates of up to 100° C. per minute, wherein the samples were held at that temperature for 4 hours. Assaker, K. et al. "Mesoporous titania with anatase walls by flash induction calcination" in Microporous and Mesoporous Materials 2015, 201, pages 43-49 relates to the production of highly ordered mesoporous titania with a semi-crystalline framework involving the calcination of a precursor material for 5 minutes at 460° C.

Benamor, T. et al. "Flash induction calcination: A powerful tool for total template removal and fine tuning of the hydrophobic/hydrophilic balance in SBA-15 type silica mesoporous materials" in Mesoporous Materials 2012, 147, pages 334-342 relates to a rapid calcination method for completely removing the organotemplate from a specific ordered mesoporous silica material involving calcination at temperatures ranging from 300 to 700° C. for alternative duration periods of 5 and 15 minutes.

In this respect, calcination procedures involving the heating of the zeolitic materials by means of microwave irradiation have been tested. Thus, Lai, T.-L. et al. "Rapid removal of organotemplate from SBA-15 with microwave assisted extraction" in Materials Letters 2009, 63, pages 1693-1695 concerns the removal of surfactant templates from the pores of SBA-15 by means of microwave assisted extraction involving heating for 2 minutes under a microwave irradiation, wherein said process is repeated 3 times for removing the template. Same applies with respect to Gallis, K. W. et al. "Rapid calcination of nanoporous silicate precursors by assisted microwave irradiation" in Adv. Mater. 2001, 13, pages 23-26, wherein nanostructured silicate composites are rapidly calcined by microwave irradiation, using minimum times of 1 minute of exposure at different average powers.

There, however, remains a need to further improve the efficiency of such calcination procedures, not only with respect to the time of the treatment procedure but also with respect to the apparatus involved and its capacity to treat large amounts of zeolitic material such as on an industrial scale.

On the other hand, reaction procedures are generally known which involve the exposure of precursor materials to very high reaction temperatures for chemical conversion wherein said methods involve very brief retention times under those conditions. Thus, in the field of inorganic chemistry by way of example, U.S. Pat. No. 3,862,294 concerns a method for flash calcining inorganic materials which involves the decomposition of the solid material with the release of gaseous compounds and reduction of the material to the oxide to produce a highly pure and active oxide of the mineral or material without the use of mechanically motivated parts or mechanisms in the unit, wherein retention times of 0.1 to 25.0 seconds are mentioned, the specific example thereof employing retention times of 5 to 15 seconds. U.S. Pat. No. 6,620,820 B1, on the other hand, relates to a process for the production of a nitrogen oxide storage material involving the calcination of an aqueous suspension of precursor materials in a hot gas stream wherein retention times of less than one minute and preferably of less than 10 seconds are discussed, wherein it is stated that residence times of under 1 second were realized. Said methods, however, are specifically aimed at allowing for the chemical conversion of precursor materials at elevated temperatures, wherein the short retention periods are not a result of the need for an increased efficiency but are rather due to the fact that the reaction times are very brief.

DETAILED DESCRIPTION

It is therefore the object of the present invention to provide a highly efficient process for the calcination of a zeolitic material in particular with respect to syntheses involving the calcination of the as-synthesize material. Thus, it has surprisingly been found that zeolitic materials may be efficiently calcined at temperatures exceeding those normally employed for their calcination when exposure at said temperatures is kept extremely short. In particular, it has quite unexpectedly been found that such a calcination regimen does not substantially deteriorate the framework structure of the zeolitic materials such that a high crystallinity is maintained despite the exposure to such extreme temperatures. Furthermore, it has surprisingly been found that despite the highly limited capacity of diffusion within the microporous system of zeolitic materials, effective removal of organotemplate compounds trapped within zeolitic framework may nevertheless be achieved using very low retention times under those conditions.

Therefore, the present invention relates to a process for the calcination of a zeolitic material, wherein said process comprises the steps of (i) providing a zeolitic material comprising $YO_2$ and optionally further comprising $X_2O_3$ in its framework structure in the form of a powder and/or of a suspension of the zeolitic material in a liquid, wherein Y stands for a tetravalent element and X stands for a trivalent element;

(ii) atomization of the powder and/or of the suspension of the zeolitic material provided in (i) in a gas stream for obtaining an aerosol; and (iii) calcination of the aerosol obtained in (ii) for obtaining a calcined powder.

As regards the alternative of the inventive process wherein in step (i) the zeolitic material is provided in the form of a suspension, no particular restrictions apply as to how such a suspension may be provided and in particular according to which procedure such a suspension may be prepared for provision in step (i). Thus, by way of example, the suspension may be obtained by synthesizing a zeolitic material according to a procedure involving the use of a solvent system and employing the immediate reaction product of said synthetic procedure which comprises the crystallized zeolitic material and the solvent system, said solvent system also being referred to as the so-called "mother liquor", in which it is suspended or may be suspended by suitable means such as by agitation and/or sonification. Within the meaning of the present invention, the term "liquid" as employed in step (i) for describing the liquid phase of the suspension principally refers to any suitable liquid, wherein said liquid is preferably the mother liquor in which the zeolitic material is contained after crystallization thereof and/or a solvent system as defined in the present application with respect to particular and preferred embodiments of the inventive process.

Therefore, it is preferred according to the inventive process that for providing the zeolitic material in the form of a suspension in (i), the process comprises the steps of (i.a) preparing a mixture comprising a source for $YO_2$ and a solvent system, wherein the mixture optionally further comprises a source for $X_2O_3$, wherein Y stands for a tetravalent element and X stands for a trivalent element;

(i.b) crystallizing the mixture prepared in (i.a) for obtaining a suspension of a zeolitic material in a mother liquor as the suspension of the zeolitic material in a liquid.

Concerning the alternative of the inventive process wherein in step (i) the zeolitic material is provided in the form of a powder, again no particular restrictions apply as to how such a powder may be provided and in particular according to which procedure such a powder may be prepared for provision in step (i). Thus, in the event wherein a synthetic zeolitic material is employed, such a powder may be provided by a procedure wherein the zeolitic material is crystallized from a mixture of suitable precursor materials and a solvent system, wherein the resulting zeolitic material is subsequently separated from the reaction mixture and in particular from the mother liquor wherein it is contained by any suitable separation means. In particular, such separation means may involve the filtration of the crystallized zeolitic material from the mother liquor and/or the centrifugation of the reaction product such as to separate the solid zeolitic material from the mother liquor. In such an instance, the separated zeolitic material may be used as such in the inventive process, i.e. as the zeolitic material in the form of a powder in step (i), or the separated zeolitic material may be subject to one or more further steps in which the powder may be suitably washed and/or dried for obtaining a powder of a higher purity and/or for obtaining a powder which may be more effectively dispersed in step (ii) of the inventive process involving the atomization of said powder provided in step (i) in a gas stream for obtaining an aerosol.

Therefore, it is further preferred according to the inventive process that for providing the zeolitic material in the form of a powder in (i), the process comprises the steps of (i.a) preparing a mixture comprising a source for $YO_2$ and a solvent system, wherein the mixture optionally further comprises a source for $X_2O_3$, wherein Y stands for a tetravalent element and X stands for a trivalent element;

(i.b) crystallizing the mixture prepared in (i.a) for obtaining a suspension of a zeolitic material in a mother liquor as the suspension of the zeolitic material in a liquid;

(i.c) separating the zeolitic material from the mother liquor obtained in (i.b), preferably by filtration and/or centrifugation, more preferably by filtration;

and (i.d) optionally washing the zeolitic material obtained in (i.b) and/or (i.c) with one or more solvents, preferably with deionized water;

and/or (i.e) optionally drying the zeolitic material obtained in (i.b) and/or (i.c) and/or (i.d), preferably in (i.c) and/or (i.d).

In instances wherein the zeolitic material crystallized for providing a zeolitic material in step (i) of the inventive process is not subject to a step of washing, it is preferred according to the inventive process that the powder for use in step (i) is obtained by spray drying of the direct crystallization product which comprises a suspension of the zeolitic material in the mother liquor. Therefore, it is further preferred according to the inventive process that for providing the zeolitic material in the form of a powder in (i), the zeolitic material in a mother liquor obtained in (i.b) is spray-dried.

According to the inventive process, synthetic procedures are alternatively preferred which do not necessitate the use of a solvent system, i.e. wherein the zeolitic material is obtained from solid-state synthesis, the direct reaction product then being provided as the powder in step (i) of the inventive process.

According to the inventive process wherein the zeolitic material is preferably provided in the form of a powder in step (i), said embodiments may further comprise a step of milling the powder for providing a powder with the desired mean particle size and/or particle size distribution, and in particular the average particle size D50 according to the particular and preferred embodiments of the inventive process as defined in the present application.

Furthermore, according to the inventive process wherein the zeolitic material provided in step (i) in the form of a powder and/or of a suspension is preferably obtained from a synthetic procedure, the aforementioned particular and preferred embodiments for obtaining such a powder and/or suspension may be combined in any suitable fashion. Thus, in instances wherein a suspension of the zeolitic material in a liquid is provided in step (i), it may be advantageous to provide the zeolitic material in a different solvent system than the mother liquor in which it is contained in the reaction mixture directly after crystallization thereof. In said instances, it is accordingly preferred to first proceed with the separation of the zeolitic material from the mother liquor, preferably by any of the particular and preferred means described in the present application, which may be optionally washed and/or dried, again preferably by any of the particular and preferred means described in the present application, for first obtaining a powder, which in a subsequent step is suspended in a suitable liquid or solvent system for providing the suspension in step (i). Accordingly, the zeolitic material in a mother liquor directly obtained from the synthetic procedure for obtaining the zeolitic material may also be directly spray dried for obtaining a powder prior to suspension thereof in a solvent mixture. Same applies accordingly with respect to zeolitic materials obtained from solid state synthesis which may be suitably suspended in a solvent system for providing the zeolitic material in the form of a suspension in step (i) of the inventive process.

Therefore, it is further preferred according to the inventive process that for providing the zeolitic material in the form of a suspension in (i), the process further comprises the steps of (i.a) preparing a mixture comprising a source for $YO_2$ and a solvent system, wherein the mixture optionally further comprises a source for $X_2O_3$, wherein Y stands for a tetravalent element and X stands for a trivalent element;

(i.b) crystallizing the mixture prepared in (i.a) for obtaining a suspension of a zeolitic material in a mother liquor as the suspension of the zeolitic material in a liquid;

(i.c) separating the zeolitic material from the mother liquor obtained in (i.b), preferably by filtration and/or centrifugation, more preferably by filtration; and (i.d) optionally washing the zeolitic material obtained in (i.b) and/or (i.c) with one or more solvents, preferably with deionized water; and/or (i.e) optionally drying the zeolitic material obtained in (i.b) and/or (i.c) and/or (i.d), preferably in (i.c) and/or (i.d);

(i.f) providing a solvent system;

(i.g) suspending the zeolitic material in the form of a powder as obtained according to (i.c) and/or (i.d) and/or (i.e), preferably according to (i.e), in the solvent system.

According to the present invention it is preferred that the zeolitic material provided in step (i) contains an organotemplate within its microporous channel system, wherein the step of calcination in (iii) leads to an at least partial removal thereof by combustion and/or thermal degradation to gaseous products which may exit the zeolitic material. As regards the organotemplate which is preferably contained within the zeolitic material provided in step (i) of the inventive process, no particular restrictions apply such that in principle any conceivable organotemplate compound may be contained therein. Since the preferred zeolitic materials containing an organotemplate as provided in step (i) of the inventive process are obtained according to a synthetic procedure employing such an organotemplate for the formation of the specific microporous channel system of a given zeolitic material, it is further preferred that the inventive process includes steps for the preparation of the zeolitic material wherein one or more organotemplate compounds are used. In particular, it is preferred that the zeolitic material provided in step (i) is prepared according to any of the particular and preferred procedures described in the present application wherein in step (i.a) thereof, the preparation of a mixture further involves the use of one or more organotemplate compounds, preferably one or more organotemplate compounds according to any of the particular and preferred embodiments defined in the present application.

Therefore, it is further preferred according to the inventive process that the mixture provided in (i.a) further comprises an organotemplate.

As noted above, there is no restriction as to the type of organotemplate which may be contained in the zeolitic material preferably provided in step (i), nor is there any restriction as to the number of different organotemplates which may be contained therein. Thus, by way of example, the organotemplate which is preferably contained in the zeolitic material provided in step (i), and which is accordingly preferably comprised in the mixture prepared in step (i.a) according to any of the particular and preferred embodiments of the inventive process, is preferably selected from the group consisting of alkanes and derivatives thereof, amines, ammonium salts, and mixtures of two or more thereof. It is, however, particularly preferred according to the present invention that the organotemplate is selected from the group consisting of tetraalkylammonium salts, alkenyltrialkylammonium salts, aryltrialkylammonium salts, dialkyldiarylammonium salts, heterocyclic amines, heterocyclic ammonium salts, adamantylammonium salts, alkylenediammonium salts, Akalkyl-trialkyleneammonium salts, N,N-diaryl-trialkyleneammonium salts, alkylamines, cycloalkylammonium salts, dialkylammonium salts, quinuclidine and derivatives thereof, quinuclidinium salts, norbornane and derivatives thereof, trialkylenediamines, and mixtures of two or more thereof. It is yet further preferred that the organotemplate is selected from the group consisting of tetramethylammonium salts, trimethylethylammonium salts, dimethyldiethylammonium salts, methyltriethylammonium salts, tetraethylammonium salts, triethylpropylammonium salts, diethyldipropylammonium salts, ethyltripropylammonium salts, tetrapropylammonium salts, trimethylpropylammonium salts, dimethyldipropylammonium salts, methyltripropylammonium salts, N-(2-propen-1-yl)-tri-n-propylammonium salts, N-(1-propen-1-yl)-tri-n-propylammonium salts, N-(1-propen-2-yl)-tri-n-propylammonium salts, N,N,N-tri($C_1$-$C_3$)alkylbenzylammonium salts, N,N,N-di($C_1$-$C_3$)alkyldibenzylammonium salts, ($C_4$-$C_6$)heterocyclic amines, ($C_4$-$C_6$)heterocyclic ammonium salts, N,N,N—($C_1$-$C_3$)trialkyl-adamantylammonium salts, N,N,N,N,N,N-hexa($C_1$-$C_3$)alkyl-($C_3$-$C_7$)alkylenediammonium salts, N,N-di($C_1$-$C_3$)alkyl-tri($C_1$-$C_3$)alkyleneammonium salts, N,N-diaryl-tri($C_1$-$C_3$)alkylenediammonium salts, tri($C_1$-$C_3$)alkylamines, di($C_1$-$C_3$)alkyl($C_5$-$C_7$)cycloalkylamines, ($C_1$-$C_3$)alkyl($C_5$-$C_7$)dicycloalkylamines, ($C_3$-$C_7$)alkylenediamines, N,N,N,N-tetra($C_1$-$C_2$)alkyl($C_3$-$C_7$)alkylenediamines, N,N,N-tri($C_1$-$C_2$)alkyl($C_5$-$C_7$)cycloalkylammonium salts, azoniobicyclo($C_6$-$C_{10}$)alkanes, quinuclidinol and derivatives thereof, N—($C_1$-$C_3$)alkylquinuclidinium salts, aminonorbornanes and derivatives thereof, tri($C_1$-$C_3$)alkylenediamines, and mixtures of two or more thereof.

According to the present invention it is yet further preferred that the organotemplate which is preferably contained in the zeolitic material provided in step (i), and which is accordingly preferably comprised in the mixture prepared in step (i.a) according to any of the particular and preferred embodiments of the inventive process is selected from the group consisting of tetramethylammonium salts, dimethyldiethylammonium salts, tetraethylammonium salts, diethyldipropylammonium salts, tetrapropylammonium salts, dimethyldipropylammonium salts, N-(2-propen-1-yl)-tri-n-propylammonium salts, N-(1-propen-1-yl)-tri-n-propylammonium salts, N,N,N-triethylbenzylammonium salts, N,N,N-ethyldimethylbenzylammonium salts, N,N,N-diethylmethylbenzylammonium salts, N,N,N-diethyldibenzylammonium salts, N,N,N-trimethylbenzylammonium salts, N,N,N-dimethyldibenzylammonium salts, N,N,N-dimethyldibenzylammonium salts, N,N,N-ethylmethyldibenzylammonium salts, N,N,N-diethyldibenzylammonium salts, N,N,N-ethylpropyldibenzylammonium salts, N,N,N-methylpropyldibenzylammonium salts, N,N,N-dipropyldibenzylammonium salts, $(C_5-C_6)$heterocylcic amines, N,N—$(C_1-C_3)$dialkyl-imidazolinium salts, N,N-di$(C_1-C_3)$alkylpiperidinium salts, N,N,N—$(C_1-C_2)$trialkyl-adamantylammonium salts, N,N,N,N,N,N-hexa$(C_1-C_2)$alkyl-$(C_6-C_7)$alkylenediammonium salts, N,N-di$(C_1-C_2)$alkyl-tri$(C_1-C_2)$alkyleneammonium salts, N,N-dibenzyl-tri$(C_1-C_2)$alkylenediammonium salts, $(C_6-C_6)$cycloalkylamines, tri$(C_1-C_2)$alkylamines, di$(C_1-C_2)$alkyl$(C_6-C_6)$cycloalkylamines, $(C_1-C_2)$alkyl$(C_6-C_6)$dicycloalkylamines, $(C_4-C_6)$alkylenediamines, N,N,N,N-tetra$(C_1-C_2)$alkyl$(C_4-C_6)$alkylenediamines, N,N,N-tri$(C_1-C_2)$alkyl$(C_5-C_6)$cycloalkylammonium salts, azonio-bicyclo$(C_7-C_9)$alkanes, 3-quinuclidinol and derivatives thereof, N—$(C_1-C_2)$alkylquinuclidinium salts, aminonorbornanes and derivatives thereof, tri$(C_1-C_2)$alkylenediamines, and mixtures of two or more thereof, wherein more preferably the organotemplate is selected from the group consisting of tetrapropylammonium salts, tetraethylammonium salts, diethyldimethylammonium salts, N-(2-propen-1-yl)-tri-n-propylammonium salts, N,N,N-trimethylbenzylammonium salts, N,N,N-dibenzyldimethylammonium salts, hexamethyleneimine, 1-ethyl-3-methylimidazolium salts, N,N-dimethyl-3,3-dimethylpiperidinium salts, N,N-methylethyl-3,3-dimethylpiperidinium salts, N,N-dimethyl-2-methylpiperidinium salts, N,N,N-trimethyl-1-adamantylammonium salts, N,N,N-trimethyl-2-adamantylammonium salts, hexamethonium salts, 1-methyl-1-azonia-4-azabicyclo[2.2.2]octane, 1,4-dibenzyl-1,4-diazoniabicyclo[2.2.2]octane, cyclohexylamine, N,N-dimethylcyclohexylamine, N,N,N-trimethylcyclohexylammonium salts, 1,3,3,6,6-pentamethyl-6-azonio-bicyclo[3.2.1]octane, N-alkyl-3-quinuclidinol, N-methylquinuclidinium salts, N,N,N-trialkyl-exoaminonorbornane, triethylenediamine, and mixtures of two or more thereof.

According to the present invention it is yet further preferred that the organotemplate which is preferably contained in the zeolitic material provided in step (i), and which is accordingly preferably comprised in the mixture prepared in step (i.a) according to any of the particular and preferred embodiments of the inventive process is selected from the group consisting of N,N,N-trimethyl-1-adamantylammonium salts, tetrapropylammonium salts, tetraethylammonium salts, hexamethonium salts, 1-ethyl-3-methylimidazolium salts, triethylenediamine, and mixtures of two or more thereof, wherein it is yet further preferred that the organotemplate is a N,N,N-trimethyl-1-adamantylammonium salt.

As regards the form in which the organotemplate is contained in the zeolitic material provided in step (i) according to particular and preferred embodiments of the inventive process, no particular restrictions apply, such that in the event that the organotemplate is a salt, it may either be contained in the microporous channel system of the zeolitic material as counterion to the zeolitic framework and in particular as cation thereto, or in the form of a salt distinct from the zeolitic material, or a portion of the organotemplate may be contained in the zeolitic material as counterion to the zeolitic framework and the remaining portion is contained therein in the form of a salt distinct from the zeolitic material. As concerns the inventive process wherein the zeolitic material is preferably crystallized from a mixture prepared in step (i.a), there is also no particular restriction as to the form in which the organotemplate is contained in the mixture such that when it is contained therein in the form of a salt, again no restrictions apply relative to the counterion which the organotemplate may have. Thus, by way of example, according to the inventive process wherein the organotemplate is preferably either contained in the zeolitic material provided in step (i) in the form of a salt or comprised in the mixture prepared in step (i.a) in the form of a salt, wherein furthermore the organotemplate constitutes the cation of the salt, the anion of said salt may by way of example be selected from the group consisting of hydroxide, halides, nitrate, nitrite, sulfates, sulfite, phosphates, phosphites, cyanide, and combinations of two or more thereof, and more preferably from the group consisting of hydroxide, fluoride, chloride, bromide, nitrate, sulfate, hydrogensulfate, dihydrogensulfate, cyanide, and combinations of two or more thereof, wherein more preferably the anion is selected from the group consisting of hydroxide, chloride, bromide, nitrate, and combinations of two or more thereof, wherein more preferably the anion is hydroxide and/or bromide, preferably hydroxide.

Therefore, it is further preferred according to the inventive process wherein the mixture provided in (i.a) preferably further comprises an organotemplate which is selected from the group consisting of ammonium salts that, independently from one another, the anion of the ammonium salts is selected from the group consisting of hydroxide, halides, nitrate, nitrite, sulfates, sulfite, phosphates, phosphites, cyanide, and combinations of two or more thereof, preferably from the group consisting of hydroxide, fluoride, chloride, bromide, nitrate, sulfate, hydrogensulfate, dihydrogensulfate, cyanide, and combinations of two or more thereof, and more preferably from the group consisting of hydroxide, chloride, bromide, nitrate, and combinations of two or more thereof, wherein more preferably the anion of the ammonium salts is hydroxide and/or bromide, preferably hydroxide.

As regards liquid in which the zeolitic material is suspended in step (i) of the inventive process and the solvent system which is used for preparing the mixture in step (i.a) or which is provided in step (i.f) according to particular and preferred embodiments of the inventive process, respectively, it is herewith noted that no particular restrictions apply relative to the liquid and/or with respect to the solvent system employed therein. Thus, by way of example, the liquid in step (i) and/or the solvent system employed in either of steps (i.a) and (i.f) may principally comprise water and/or one or more organic solvents, wherein it is preferred that the liquid and/or solvent system comprises one or more solvents selected from the group consisting of water, monohydric alcohols, polyhydric alcohols, and combinations of two or more thereof, wherein more preferably the liquid in step (i) and/or the solvent system is selected from the group consisting of water, methanol, ethanol, propanol, butanol, pentanol, ethane-1,2-diol, propane-1,2-diol, propane-1,2,3-triol, butane-1,2,3,4-tetraol, pentane-1,2,3,4,5-pentol, and combinations of two or more thereof. According to the present invention it is further preferred that the liquid and/or solvent system is selected from the group consisting of water, methanol, ethanol, 2-propanol, and mixtures of two or more thereof, wherein it is particularly preferred that the liquid and/or solvent system comprises water, preferably deionized water. According to the present invention it is particularly preferred that deionized water is employed as the liquid in step (i) and/or as the solvent system in (i.a) and (i.f).

Concerning the preferred crystallization conducted in step (i.b) according to the inventive process, no particular restrictions apply relative to the conditions under which said crystallization is performed, provided that the mixture prepared in step (i.a) may effectively be crystallized for affording a zeolitic material. Thus, as regards the temperature at which step (i.b) is performed, although no restrictions apply, it is preferred that crystallization in (i.b) is performed under heating of the mixture prepared in (i.a). In this respect, heating may be performed at any temperature suitable for crystallization, wherein it is preferred that the mixture prepared in (i.a) is conducted under heating thereof to a temperature in the range of from 80 to 220° C., and preferably from 100 to 200° C., more preferably from 110 to 190° C., and even more preferably from 120 to 180° C.

With respect to the duration of the crystallization conducted in (i.b) same applies accordingly, such that in principle any suitable duration may be employed. According to the inventive process it is however preferred, in particular according to particular and preferred embodiments thereof wherein the crystallization in (i.b) is conducted under heating, that the crystallization in (i.b) is conducted for a period ranging anywhere from 0.1 to 50 d, and preferably from 0.3 to 30 d, more preferably from 0.6 to 13 d, more preferably from 0.8 to 10 d, more preferably from 1 to 7 d, more preferably from 1.5 to 5 d, and more preferably from 2 to 4.5 d. According to the inventive process it is particularly preferred crystallization in (i.b) is conducted for a period ranging from 2.5 to 3.5 d, in particular in instances wherein the crystallization is conducted under heating of the mixture prepared in (i.a).

Finally, as regards the pressure under which crystallization in (i.b) is conducted, again no particular restrictions apply such that any suitable pressure may be employed for crystallization of a zeolitic material in said step. It is, however, preferred according to the inventive process that the crystallization in (i.b) is conducted under autogenous pressure. For achieving such a pressure, any suitable apparatus may be employed, wherein it is preferred in such instances that the crystallization in (i.b.) is performed in a pressure tight vessel and preferably in an autoclave.

As concerns the zeolitic material provided step (i) of the inventive process, and which is preferably crystallized in step (i.b) according to particular and preferred embodiments thereof, any suitable zeolitic material may be employed provided that it displays a regular structure comprising repeating unit cells which define a three-dimensional microporous channel system having in particular a framework structure selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, -EWT, EZT, FAR, FAU, FER, FRA, GIS, GIU, GME, GON, GOO, HEU, IFO, IFR, IFW, IFY, IHW, IMF, IRN, IRR, -IRY, ISV, ITE, ITG, ITH, -ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRE, MSE, MSO, MTF, MTN, MTT, MTW, MVY, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFV, SFW, SGT, SIV, SOD, SOF, SOS, SSF, -SSO, SSY, STF, STI, STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, including mixed structures of two or more thereof. According to the inventive process, it is however preferred that the zeolitic material provided in (i), which is preferably crystallized in step (i.b) according to particular and preferred embodiments thereof, has a framework structure selected from the group consisting of BEA, CHA, EUO, FAU, FER, HEU, LEV, MEL, MFI, MOR, MTN, MWW, and TON, including mixed structures of two or more thereof, and more preferably from the group consisting of BEA, CHA, EUO, FAU, FER, LEV, MFI, MOR, MTN, MWW, and TON, including mixed structures of two or more thereof. According to the inventive process it is particularly preferred that the zeolitic material provided in (i), which is preferably crystallized in step (i.b) according to particular and preferred embodiments thereof, has a framework structure selected from the group consisting of BEA, CHA, LEV, MFI, MWW, including mixed structures of two or more thereof, wherein it is particularly preferred according to the present invention that the zeolitic material provided in (i) has a CHA framework structure.

With respect to the tetravalent element Y contained in the framework structure of the zeolitic material provided in step (i), no particular restriction applies such that in principle Y may stand for any suitable tetravalent element or combination of tetravalent elements. It is, however, preferred according to the present invention that Y is selected from the group consisting of Si, Sn, Ti, Zr, Ge, and mixtures of two or more thereof. According to the present invention it is particularly preferred that Y stands for Si and/or Ti wherein more preferably Y is Si.

According to the inventive process wherein Y preferably stands for Si and wherein the zeolitic material in step (i) is prepared according to any of the particular and preferred embodiments described in the present application, there is no particular restriction as to the source for $SiO_2$ which may be employed in step (i.a), provided that a zeolitic material may be obtained in step (i.b) upon crystallization of the mixture prepared in step (i.a). Thus, by way of example, the source for $SiO_2$ provided in (i.a) may comprise one or more compounds selected from the group consisting of silicas, silicates, silicic acid, and combinations of two or more thereof, wherein it is preferred according to the present invention that the source for $SiO_2$ is selected from the group consisting of silicas, alkali metal silicates, silicic acid, and combinations of two or more thereof, and more preferably from the group consisting of fumed silica, colloidal silica, reactive amorphous solid silica, silica gel, pyrogenic silica, lithium silicates, sodium silicates, potassium silicates, silicic acid, and combinations of two or more thereof. According to the present invention it is particularly preferred that the source for $SiO_2$ provided in (i.a) comprises one or more compounds selected from the group consisting of fumed silica, silica gel, pyrogenic silica, sodium silicates, silicic acid, and combinations of two or more thereof, and more preferably from the group consisting of fumed silica, silica gel, pyrogenic silica, and combinations of two or more thereof. According to the present invention it is particularly preferred that the source for $SiO_2$ used in step (i.a) comprises fumed and/or pyrogenic silica, wherein preferably fumed silica is used as the source of $SiO_2$ for preparing the mixture in step (i.a) according to any of the particular and preferred embodiments as described in the present application.

With respect to the trivalent element X optionally contained in the framework structure of the zeolitic material provided in step (i), no particular restriction applies such that in principle X may stand for any suitable trivalent element or combination of trivalent elements. It is, however, preferred according to the present invention that X is selected from the group consisting of Al, B, In, Ga, and mixtures of two or more thereof. According to the present invention it is particularly preferred that X stands for Al and/or B, and more preferably that X stands for Al.

Furthermore, according to the inventive process wherein X preferably stands for Al and wherein the zeolitic material in step (i) is prepared according to any of the particular and preferred embodiments described in the present application, there is no particular restriction as to the source for $Al_2O_3$ which may be employed in step (i.a) provided that a zeolitic material may be obtained in step (i.b) upon a crystallization of the mixture prepared in step (i.a). Thus, by way of example, the source for $Al_2O_3$ optionally provided in (i.a) comprises one or more compounds selected from the group consisting of aluminum, aluminum alkoxides, alumina, aluminates, and combinations of two or more thereof. According to the present invention it is particularly preferred that the source for $Al_2O_3$ provided in step (i.a) comprises an aluminate, and more preferably comprises sodium and/or potassium aluminate. According to the present invention it is particularly preferred that the source for $Al_2O_3$ used in step (i.a) comprises sodium aluminate, wherein preferably sodium aluminate is used as the source for $Al_2O_3$ for preparing the mixture in step (i.a) according to any of the particular and preferred embodiments as described in the present application.

As regards the further components which may be contained in the mixture prepared in step (i.a) no particular restrictions apply according to the present invention such that any further suitable compounds may be employed for preparing the mixture to be crystallized in step (i.b) according to any of the particular and preferred embodiments of the inventive process. Thus, it is preferred according to the present invention that a source of $Z_2O_5$ is further provided in (i.a), wherein Z stands for a pentavalent element. As regards the pentavalent element Z which may be employed according to the present invention, again no particular restrictions apply provided that a zeolitic material may be crystallized in step (i.b.), wherein it is however preferred that said pentavalent element is chosen such that a zeolitic material comprising $Z_2O_5$ in addition to $YO_2$ and $X_2O_3$ in its framework structure may be obtained. Accordingly, it is preferred according to the present invention that Z is selected from the group consisting of P, As, Sb, Bi, V, Nb, Ta, and combinations of two or more thereof, preferably from the group consisting of P, As, V, and combinations of two or more thereof. According to the present invention it is particularly preferred that Z stands for P and/or As, wherein more preferably Z stands for P.

Furthermore, one or more alkali metals may be contained in the mixture prepared in step (i.a). This applies in particular in instances wherein salts are employed as the source for $YO_2$ and/or $X_2O_3$, and/or in instances wherein the pH necessary for crystallization requires the use of one or more bases wherein typically alkali metal hydroxides and in particular sodium and/or potassium hydroxide may be used. It is, however, preferred according to the present invention that the amount of alkali metals in the mixture prepared in step (i.a) is kept low such that it is preferred that the mixture prepared in (i.a) and crystallized in (i.b) contains 5 wt.-% or less of Na and/or K, and preferably of Na based on 100 wt.-% of $YO_2$ contained in the mixture prepared in (i.a), and more preferably 3 wt.-% or less, more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, and more preferably 0.005 wt.-% or less of Na and/or K, and preferably of Na based on 100 wt.-% of $YO_2$ contained in the mixture prepared in (i.a). According to the present invention it is particularly preferred that the mixture prepared step (i.a) contains 0.001 wt.-% or less of Na and/or K, and preferably 0.001 wt.-% or less of Na based on 100 wt.-% of $YO_2$ contained in the mixture prepared in (i.a).

As regards the characteristics of the powder and/or of the suspension of the zeolitic material provided in step (i), no particular restrictions apply such that principally any type of power and/or of suspension may be employed provided that atomization thereof for obtaining and aerosol in step (ii) is possible. It is, however, preferred that the particles of the powder display an average particle size which is suitable for obtaining a homogenous and stable aerosol in step (ii). Same applies accordingly with respect to the particles contained in the suspension of the zeolitic material in a liquid which should be suitable for creating droplets of a size which is again suitable for obtaining a homogenous and stable aerosol in step (ii). Thus, by way of example, it is preferred that the average particle size D50 of the particles in the powder and/or in the suspension provided in step (i) is in the range of from 0.1 to 100 μm, and more preferably of from 0.3 to 50 μm, more preferably of from 0.5 to 30 μm, more preferably of from 1 to 25 μm, more preferably of from 1.5 to 20 μm, more preferably of from 2 to 15 μm, more preferably of from 3 to 11 μm. According to the inventive process it is however particularly preferred that the average particle size D50 of the particles in the power and/or in the suspension provided in step (i) is in the range of from 5 to 10 μm.

Same applies accordingly according to the present invention with respect to the average particle size of the powder particles and/or of the droplets from the suspension in the aerosol obtained in step (ii). Accordingly, although there is again no particular restriction with respect to the average particle size of the particles contained in the aerosol, it is preferred that the average particle size is such that a homogenous and stable aerosol may be provided. Thus, it is preferred according to the present invention that the average particle size D50 of the powder particles and/or of the droplets from the suspension in the aerosol obtained in (ii) is in the range of from 0.5 to 500 μm, and more preferably of from 1 to 300 μm, more preferably of from 5 to 200 μm, more preferably of from 10 to 150 μm, more preferably of from 12 to 100 μm, more preferably of from 15 to 80 μm, more preferably of from 18 to 60 μm. According to the inventive process it is however particularly preferred that the average particle size D50 of the powder particles and/or of the droplets from the suspension in the aerosol obtained in step (ii) is in the range of from 20 to 50 μm.

As regards the preferred average particle size D50 as defined with respect to the present invention in the present application, it is preferred that said average particle size refers to the average particle size D50 of the given particles as determined according to ISO 13320:2009.

Concerning the method according to which atomization of the powder and/or of the suspension of the zeolitic material provided in step (i) in a gas stream for obtaining an aerosol is performed in step (ii), no particular restrictions apply according to the present invention such that any conceivable method may be employed to this effect provided that it is suitable for preparing an aerosol starting from the powder and/or from the suspension provided in step (i). Preferably, the respective method will be adapted either for the atomization of a powder or for the atomization of a suspension of the zeolitic material such that it is preferred that different methods are employed for the atomization depending on whether a powder or a suspension is employed for obtaining an aerosol. Thus, in instances wherein atomization of a suspension of the zeolitic material in a liquid is achieved in step (ii) it is preferred that the atomization is conducted with a spray nozzle. In instances wherein atomization of a powder of the zeolitic material is achieved in step (ii), on the other hand, this may be achieved by introducing the powder into a gas stream, wherein this is preferably achieved with a screw feeder and/or with a vibrating chute.

As regards the gas stream which is employed in step (ii) for obtaining an aerosol, again no particular restrictions apply such that any suitable gas stream may be employed provided that a homogenous and stable aerosol may be obtained. Thus, by way of example, the gas stream may comprise one or more gases selected from the group consisting of oxygen, nitrogen, carbon dioxide, carbon monoxide, helium, neon, argon, steam, air, and combinations of two or more thereof, wherein according to the present invention it is preferred that the gas stream comprises one or more gases selected from the group consisting of oxygen, nitrogen, carbon dioxide, argon, steam, air, and combinations of two or more thereof. According to the present invention it is however particularly preferred that air is employed as the gas in the gas stream in (ii).

According to the present invention it is preferred that calcination in step (iii) is at least in part or entirely performed in an oxygen containing atmosphere. This applies in particular in instances wherein a reaction between the zeolitic material and oxygen is desired for obtaining a specific calcined powder, wherein in particular such a reaction is desired in instances wherein the zeolitic material contains an organotemplate which is trapped within the microporous structure of the zeolitic material, and wherein it is desired to remove said organotemplate to a given degree for obtaining a zeolitic material with accessible micropores and/or microporous channels. In said instances it is desired that oxygen comprised in the gas stream reacts with the organotemplate material for affording gaseous products which may freely exit the micropores and/or microporous channels of the zeolitic material. Thus, according to the inventive process wherein calcination in step (iii) is preferably at least in part or entirely conducted in an oxygen containing atmosphere, it is further preferred that the oxygen content of the atmosphere in vol.-% based on the total volume of the gases therein is in the range of from 1 to 100 vol.-%, and more preferably of from 3 to 80 vol.-%, more preferably from 5 to 50 vol.-%, more preferably from 10 to 40 vol.-%, more preferably from 15 to 30 vol.-%, and more preferably from 18 to 25 vol.-%. According to the present invention it is particularly preferred that the calcination in step (iii) is conducted in an oxygen containing atmosphere wherein the oxygen content of the atmosphere based on the total volume of the gases therein is in the range of from 20 to 22 vol.-%.

Alternatively or in addition thereto, it is preferred according to the inventive process that the calcination in (iii) is at least in part or entirely conducted in an inert gas atmosphere. As regards the inert gas atmosphere according to the present invention, said atmosphere may comprise any conceivable gas or gas mixture provided that it does not react with the zeolitic material and/or with an organotemplate which is eventually trapped within the microporous structure of the zeolitic material according to any of the particular and preferred embodiments of the present invention as defined in the present application. Thus, by way of example, the inert gas atmosphere may comprise nitrogen and/or one or more noble gases, wherein preferably the inert gas atmosphere comprises one or more gases selected from the group consisting of nitrogen, helium, neon, argon, krypton, xenon, and mixtures of two or more thereof, more preferably from the group consisting of nitrogen, helium, argon, and mixtures of two or more thereof, and more preferably from the group consisting of nitrogen, argon, and mixtures thereof. According to the present invention it is however particularly preferred that the inert gas atmosphere comprises nitrogen, wherein even more preferably the inert gas atmosphere consists of nitrogen.

Alternatively or in addition to either of the aforementioned, it is preferred that calcination in step (iii) is at least in part or entirely performed in an atmosphere with a low oxygen content. As regards the content in oxygen of such an atmosphere, no particular restrictions apply, such that in principle any suitable content of oxygen may be employed, provided that it is inferior to the oxygen content of air. Thus, by way of example, when using an atmosphere with low oxygen content in calcination in step (iii) of the inventive process, the oxygen content in vol.-% based on the total volume of the gases therein may lie anywhere from 0.1 to 20 vol.-%, wherein preferably the oxygen content of the atmosphere with low oxygen content ranges from 0.3 to 18 vol.-%, more preferably from 0.5 to 15 vol.-%, more preferably from 1 to 12 vol.-%, more preferably from 2 to 10 vol.-%, more preferably from 3 to 8 vol.-%, and more preferably from 4 to 6 vol.-%. According to the inventive process it is particularly preferred that the atmosphere with low oxygen content employed in step (iii) contains from 4.5 to 5.5 vol.-% of oxygen.

In instances wherein the calcination in step (iii) is performed in part in an oxygen containing atmosphere according to any of the particular and preferred embodiments described in the present application, it is preferred that for the remainder of the calcination step and in particular that in the first part of the calcination step, calcination is performed under an inert gas atmosphere and/or in an atmosphere with low oxygen content as respectively defined according to any of the particular and preferred embodiments described in the present application.

With respect to the step of calcination of the aerosol obtained in step (ii) in step (iii) for obtaining a calcined powder, no particular restrictions apply relative to the conditions under which the calcination is performed provided that these are sufficient for obtaining a calcined powder. Thus, as regards the temperature of the calcination in step (iii), given the fact that a zeolitic material is to be calcined said temperature may be in the range of anywhere from 500 to 1500 K, wherein preferably the temperature of calcination is in the range of from 600 to 1400 K, more preferably of from 700 to 1300 K, more preferably of from 850 to 1200 K, and more preferably from 900 to 1100 K. According to the present invention it is particularly preferred that the temperature of calcination in step (iii) is in the range of from 950 to 1050 K.

As regards the duration of the calcination, on the other hand, it is preferred according to the present invention that the duration is held to a strict minimum in particular in view of avoiding any deterioration of the zeolitic framework occurring during prolonged exposition thereof to elevated temperatures as employed for calcination thereof. In particular, it has surprisingly been found according to the present invention that due to the atomization of the zeolitic material as a powder and/or in droplets of a suspension, optimal convection and thus optimal heating and cooling rates may be achieved compared to the heating of agglomerated particles such as performed in conventional calcination procedures. Thus, due to said technical effect of the calcination procedure according to the present invention, extremely short and therefore highly effective retention times at the calcination temperatures may be realized not only for achieving calcination as such but also quite unexpectedly for effectively removing any organotemplate materials present within the zeolitic material. Accordingly, by way of example, the duration of the calcination in step (iii) of the inventive process may be in the range of anywhere from 5 ms to 30 s, and is preferably in the range of from 20 ms to 15 s, more preferably of from 50 ms to 10 s, more preferably of from 200 ms to 8 s, more preferably from 500 ms to 5 s, and more preferably from 1 s to 3 s. According to the present invention it is particularly preferred that the duration of the calcination in step (iii) of the inventive process is in the range of from 1.5 to 2.5 s.

Concerning the way in which the calcination temperature is achieved in step (iii) of the inventive process, again no particular restrictions apply such that any suitable heating source and/or process may be employed. According to the inventive process it is however preferred that calcination in (iii) is achieved by contacting the aerosol with a hot gas stream, wherein preferably the hot gas stream is generated by heating a gas stream with a heating element. It is particularly preferred according to the present invention that the hot gas stream is generated using a flame and/or an electrically heating element. When employing a flame for generating the hot gas stream, any suitable combustible may be employed to this effect, wherein preferably the flame is generated from the combustion of a gas, wherein the gas is preferably selected from the group consisting of methane, ethane, propane, butane, acetylene, ethylene, natural gas, and mixtures of two or more thereof, more preferably from the group consisting of methane, ethane, ethylene, propane, natural gas, and mixtures of two or more thereof, wherein even more preferably the flame is generated from the combustion of methane and/or natural gas, more preferably of natural gas. When employing an electrically heating element, any suitable element may be employed to this effect, wherein preferably the electrically heating element comprises silicon carbide.

According to the present invention, the process for the calcination of a zeolitic material may be repeated one or more times. In principle, there is no restriction as to the number of times the process may be repeated, wherein preferably the calcined powder obtained in (iii) is provided as the zeolitic material in (i) in the form of a powder or in the form of a suspension of the zeolitic material in a liquid. By way of example, the process may be repeated one or more times, wherein preferably the process is repeated 1 to 10 times, more preferably 1 to 5 times, more preferably 1 to 3 times, and more preferably once or twice. According to the present invention it is further preferred that the process for the calcination of a zeolitic material is repeated once.

It is, however, particularly preferred according to the present invention that the process for the calcination of a zeolitic material is not repeated but done in a single pass.

In principle, the inventive process is not limited to steps (i), (ii), and (iii) as respectively defined according to any of the particular and preferred embodiments of the present application but may contain further steps preceding said steps, in between any of said steps, and/or following said steps. According to the present invention it is thus preferred that the process further comprises one or more calcination steps performed in a rotary kiln. These additional steps may be performed one or more times and may be suitably performed before or after one or more of steps (i), (ii), and (iii). According to the inventive process it is however preferred that prior to step (ii) the powder provided in (i) is subject to one or more calcination steps performed in a rotary kiln. Alternatively or in addition thereto, it is preferred that the calcined powder obtained in (iii) is subject to one or more calcination steps performed in a rotary kiln.

The present invention further relates to a calcined zeolitic material as such which is obtained and/or obtainable according to any of the particular preferred embodiments of the inventive process as described in the present application. Therefore, the present invention relates to a zeolitic material displaying specific characteristics in particular with respect to its framework structure, morphology, and crystallinity as well as with respect to its average particle size which may be achieved by treating a zeolitic material according to the process of the present invention as described in the present application.

Accordingly, it is preferred according to the present invention that the inventive zeolitic material obtainable and/or obtained according to the inventive process displays an average particle size D50 in the range of from 0.1 to 100 µm, and more preferably in the range of from 0.3 to 50 µm, more preferably of from 0.5 to 30 µm, more preferably of from 1 to 25 µm, more preferably of from 1.5 to 20 µm, more preferably of from 2 to 15 µm, and more preferably of from 3 to 11 µm. According to the present invention it is particularly preferred that the inventive zeolitic material displays an average particle size D50 in the range of from 5 to 10 µm.

Furthermore, it is preferred according to the present invention that the inventive zeolitic material obtainable and/or obtained according to the inventive process displays a high crystallinity despite the high temperatures employed in the calcination step (iii) and/or in one or more additional calcination steps involving the use of a rotary kiln according to any of the particular and preferred embodiments defined in the present application, respectively. As regards the crystallinity of the inventive zeolitic material, in principle no restrictions apply with respect to its crystallinity, wherein it is preferred that it's crystallinity is superior to the crystallinity obtained for a zeolitic material calcined according to a comparable calcination treatment which does not employ an aerosol of the zeolitic material. In particular, with respect to zeolitic materials obtained with the aid of an organotemplate which is subsequently removed by calcination, it is preferred that the crystallinity of the inventive zeolitic material is superior to the crystallinity obtained for a zeolitic material subject to a calcination treatment which does not employ an aerosol of the zeolitic material and for which the organotemplate has been removed to the same extent as for the inventive material. Thus, by way of example, the crystallinity of the inventive zeolitic material may range anywhere from 30 to 100%, wherein preferably the crystallinity of the inventive zeolitic material ranges from 50 to 98%, more preferably from 60 to 97%, more preferably from 70 to 96%, more preferably from 80 to 95%, and more preferably from 85 to 94%. According to the present invention it is particularly preferred that the crystallinity of the inventive zeolitic material ranges from 88 to 93%. As regards the method according to which the crystallinity is determined according to the present invention, it is preferred that the crystallinity is determined according to the method described in the experimental section of the present application.

Finally, according to particular and preferred embodiments of the present application wherein the zeolitic material is obtained with the aid of an organotemplate, there is no particular restriction as to the portion of the organotemplate which may be removed by the inventive process, wherein it is particularly preferred that substantially all of the organotemplate may be removed. As regards the portion of the organotemplate which may be removed, according to the present invention, this is preferably based on the carbon content remaining in the zeolitic material after having been subject to the inventive process compared to the carbon content in the zeolitic material prior to calcination and preferably in the uncalcined zeolitic material. More specifically, for a zeolitic material comprising 20 wt.-% carbon calculated as the element prior to calcination and/or in the uncalcined state which only contains 5 wt.-% carbon after having been subject to the inventive process, this accordingly constitutes an effective reduction of the carbon content by 75%. Thus, by way of example, the carbon content of the zeolitic material compared to prior to calcination thereof and/or to the uncalcined zeolitic material may have been reduced by anywhere from 30 to 100%, wherein the carbon content has preferably been reduced by from 50 to 100%, more preferably from 60 to 100%, more preferably from 70 to 100%, more preferably from 80 to 100%, more preferably from 90 to 100%, more preferably from 95 to 100%, more preferably from 98 to 100%, more preferably from 99 to 100%, and more preferably from 99.5 to 100%. According to the present invention it is particularly preferred that the carbon content of the zeolitic material compared to prior to calcination thereof and/or to the uncalcined zeolitic material has been reduced by from 99.9 to 100%.

As regards the method for determining the carbon content of zeolitic materials, no particular restrictions apply according to the present invention such that in principle any suitable method may be employed to this effect. It is, however, preferred according to the present invention that the carbon content of the zeolitic material is determined via elemental analysis, more preferably by combustion analysis.

Finally, the present invention also relates to the use of the inventive zeolitic material as described in the present application. In principle, the inventive zeolitic material may be used in any suitable fashion such that no restrictions apply relative to the applications in which it may find use. It is, however, preferred according to the present invention that the inventive zeolitic material is used as a molecular sieve, as an adsorbent, for ion-exchange, as a catalyst and/or as a catalyst support. According to the present invention it is however particularly preferred that the inventive zeolitic material is used as a catalyst and/or as a catalyst support, and in particular as a catalyst.

The present invention includes the following embodiments, wherein these include the specific combinations of embodiments as indicated by the respective interdependencies defined therein:

1. A process for the calcination of a zeolitic material, wherein said process comprises the steps of
   (i) providing a zeolitic material comprising $YO_2$ and optionally further comprising $X_2O_3$ in its framework structure in the form of a powder and/or of a suspension of the zeolitic material in a liquid, wherein Y stands for a tetravalent element and X stands for a trivalent element;
   (ii) atomization of the powder and/or of the suspension of the zeolitic material provided in (i) in a gas stream for obtaining an aerosol;
   (iii) calcination of the aerosol obtained in (ii) for obtaining a calcined powder.

2. The process of embodiment 1, wherein for providing the zeolitic material in the form of a suspension in (i), the process comprises the steps of
   (i.a) preparing a mixture comprising a source for $YO_2$ and a solvent system, wherein the mixture optionally further comprises a source for $X_2O_3$, wherein Y stands for a tetravalent element and X stands for a trivalent element;
   (i.b) crystallizing the mixture prepared in (i.a) for obtaining a suspension of a zeolitic material in a mother liquor as the suspension of the zeolitic material in a liquid.

3. The process of embodiment 2, wherein for providing the zeolitic material in the form of a powder in (i), the process further comprises the steps of
   (i.c) separating the zeolitic material from the mother liquor obtained in (i.b), preferably by filtration and/or centrifugation, more preferably by filtration;
   and
   (i.d) optionally washing the zeolitic material obtained in (i.b) and/or (i.c) with one or more solvents, preferably with deionized water;
   and/or
   (i.e) optionally drying the zeolitic material obtained in (i.b) and/or (i.c) and/or (i.d), preferably in (i.c) and/or (i.d).

4. The process of embodiment 2, wherein for providing the zeolitic material in the form of a powder in (i), the zeolitic material in a mother liquor obtained in (i.b) is spray-dried.

5. The process of embodiment 3, wherein for providing the zeolitic material in the form of a suspension in (i), the process further comprises the steps of
   (i.f) providing a solvent system;
   (i.g) suspending the zeolitic material in the form of a powder as obtained according to
   (i.c) and/or (i.d) and/or (i.e), preferably according to (i.e), in the solvent system.

6. The process of any of embodiments 2 to 5, wherein the mixture provided in (i.a) further comprises an organotemplate, wherein the organotemplate is preferably selected from the group consisting of alkanes and derivatives thereof, amines, ammonium salts, and mixtures of two or more thereof,
   more preferably from the group consisting of tetraalkylammonium salts, alkenyltrialkylammonium salts, aryltrialkylammonium salts, dialkyldiarylammonium salts, heterocyclic amines, heterocyclic ammonium salts, adamantylammonium salts, alkylenediammonium salts, N-alkyl-trialkyleneammonium salts, N,N-diaryltrialkyleneammonium salts, alkylamines, cycloalkylammonium salts, dialkylammonium salts, quinuclidine and derivatives thereof, quinuclidinium salts, norbornane and derivatives thereof, trialkylenediamines, and mixtures of two or more thereof, more preferably from the group consisting of tetramethylammonium salts, trimethylethylammonium salts, dimethyldiethylammonium salts, methyltriethylammonium salts, tetraethylammonium salts, triethylpropylammonium salts, diethyldipropylammonium salts, ethyltripropylammonium salts, tetrapropylammonium salts, trimethylpropylammonium salts, dimethyldipropylammonium salts, methyltripropylammonium salts, N-(2-propen-1-yl)-tri-n-propylammonium salts, N-(1-propen-1-yl)-tri-n-propylammonium salts, N-(1-propen-2-yl)-tri-n-propylammonium salts, N,N,N-tri($C_1$-$C_3$)alkylbenzylammonium salts, N,N,N-di($C_1$-$C_3$)alkyldibenzylammonium salts, ($C_4$-$C_6$)heterocyclic amines, ($C_4$-$C_6$)heterocyclic ammonium salts, N,N,N—($C_1$-$C_3$)trialkyl-adamantylammonium salts, N,N,N,N,N-hexa($C_1$-$C_3$)alkyl-($C_3$-$C_7$)alkylenediammonium salts, N,N-di($C_1$-$C_3$)alkyl-tri($C_1$-$C_3$)alkyleneammonium salts, N,N-diaryl-tri($C_1$-$C_3$)alkylenediammonium salts, tri($C_1$-$C_3$)alkylamines, di($C_1$-$C_3$)alkyl($C_5$-$C_7$)cycloalkylamines, ($C_1$-$C_3$)alkyl($C_5$-$C_7$)dicycloalkylamines, ($C_3$-$C_7$)alkylenediamines, N,N,N,N-tetra($C_1$-$C_2$)alkyl($C_3$-$C_7$)alkylenediamines, N,N,N-tri($C_1$-$C_2$)alkyl($C_5$-$C_7$)cycloalkylammonium salts, azonio-bicyclo($C_6$-$C_{10}$)alkanes, quinuclidinol and derivatives thereof, N—($C_1$-$C_3$)alkylquinuclidinium salts, aminonorbornanes and derivatives thereof, tri($C_1$-$C_3$)alkylenediamines, and mixtures of two or more thereof, more preferably from the group consisting of tetramethylammonium salts, dimethyldiethylammonium salts, tetraethylammonium salts, diethyldipropylammonium salts, tetrapropylammonium salts, dimethyldipropylammonium salts, N-(2-propen-1-yl)-tri-n-propylammonium salts, N-(1-propen-1-yl)-tri-n-propylammonium salts, N,N,N-triethylbenzylammonium salts, N,N,N-ethyldimethylbenzylammonium salts, N,N,N-diethylmethylbenzylammonium salts, N,N,N-diethyldibenzylammonium salts, N,N,N-trimethylbenzylammonium salts, N,N,N-dimethyldibenzylammonium salts, N,N,N-dimethyldibenzylammonium salts, N,N,N-ethylmethyldibenzylammonium salts, N,N,N-diethyldibenzylammonium salts, N,N,N-ethylpropyldibenzylammonium salts, N,N,N-methylpropyldibenzylammonium salts, N,N,N-dipropyldibenzylammonium salts, ($C_5$-$C_6$)heterocylcic amines, N,N—($C_1$-$C_3$)dialkyl-imidazolinium salts, N,N-di($C_1$-$C_3$)alkylpiperidinium salts, N,N,N—($C_1$-$C_2$)trialkyl-adamantylammonium salts, N,N,N,N,N,N-hexa($C_1$-$C_2$)alkyl-($C_5$-$C_7$)alkylenediammonium salts, N,N-di($C_1$-$C_2$)alkyl-tri($C_1$-$C_2$)alkyleneammonium salts, N,N-dibenzyl-tri($C_1$-$C_2$)alkylenediammonium salts, ($C_5$-$C_6$)cycloalkylamines, tri($C_1$-$C_2$)alkylamines, di($C_1$-$C_2$)alkyl($C_5$-$C_6$)cycloalkylamines, ($C_1$-$C_2$)alkyl($C_5$-$C_6$)dicycloalkylamines, ($C_4$-$C_6$)alkylenediamines, N,N,N,N-tetra($C_1$-$C_2$)alkyl($C_4$-$C_6$)alkylenediamines, N,N,N-tri($C_1$-$C_2$)alkyl($C_5$-$C_6$)cycloalkylammonium salts, azonio-bicyclo($C_7$-$C_9$)alkanes, 3-quinuclidinol and derivatives thereof, N—($C_1$-$C_2$)alkylquinuclidinium salts, aminonorbornanes and derivatives thereof, tri($C_1$-$C_2$)alkylenediamines, and mixtures of two or more thereof, more preferably from the group consisting of tetrapropylammonium salts, tetraethylammonium salts, diethyldimethylammonium salts, N-(2-propen-1-yl)-tri-n-propylammonium salts, N,N,N-trimethylbenzylammonium salts, N,N,N-dibenzyldimethylammonium salts, hexamethyleneimine, 1-ethyl-3-methylimidazolium salts, N,N-dimethyl-3,3-dimethylpiperidinium salts, N,N-methylethyl-3,3-dimethylpiperidinium salts, N,N-dimethyl-2-methylpiperidinium salts, N,N,N-trimethyl-1-adamantylammonium salts, N,N,N-trimethyl-2-adamantylammonium salts, hexamethonium salts, 1-methyl-1-azonia-4-azabicyclo[2.2.2]octane, 1,4-dibenzyl-1,4-diazoniabicyclo[2.2.2]octane, cyclohexylamine, N,N-dimethylcyclohexylamine, N,N,N-trimethylcyclohexylammonium salts, 1,3,3,6,6-pentamethyl-6-azonio-bicyclo[3.2.1]octane, N-alkyl-3-quinuclidinol, N-methylquinuclidinium salts, N,N,N-trialkyl-exoaminonorbornane, triethylenediamine, and mixtures of two or more thereof, wherein more preferably the mixture provided in (i.a) further comprises an organotemplate selected from the group consisting of N,N,N-trimethyl-1-adamantylammonium salts, tetrapropylammonium salts, tetraethylammonium salts, hexamethonium salts, 1-ethyl-3-methylimidazolium salts, triethylenediamine, and mixtures of two or more thereof, wherein more preferably the mixture provided in (i.a) further comprises a N,N,N-trimethyl-1-adamantylammonium salt as an organotemplate.

7. The process of embodiment 6, wherein independently from one another, the anion of the ammonium salts is selected from the group consisting of hydroxide, halides, nitrate, nitrite, sulfates, sulfite, phosphates, phosphites, cyanide, and combinations of two or more thereof, preferably from the group consisting of hydroxide, fluoride, chloride, bromide, nitrate, sulfate, hydrogensulfate, dihydrogensulfate, cyanide, and combinations of two or more thereof, more preferably from the group consisting of hydroxide, chloride, bromide, nitrate, and combinations of two or more thereof, wherein more preferably the anion of the ammonium salts is hydroxide and/or bromide, preferably hydroxide.

8. The process of any of embodiments 2 to 7, wherein independently from one another, the solvent system provided in (i.a) and (i.f) comprises water and/or one or more organic solvents, and preferably comprises one or more solvents selected from the group consisting of water, monohydric alcohols, polyhydric alcohols, and combinations of two or more thereof, more preferably selected from the group consisting of water, methanol, ethanol, propanol, butanol, pentanol, ethane-1,2-diol, propane-1,2-diol, propane-1,2,3-triol, butane-1,2,3,4-tetraol, pentane-1,2,3,4,5-pentol, and combinations of two or more thereof, more preferably from the group consisting of water, methanol, ethanol, 2-propanol, and mixtures of two or more thereof, wherein more preferably the solvent system comprises water, preferably deionized water, wherein more preferably deionized water is provided as the solvent system in (i.a) and (i.f).

9. The process of any of embodiments 2 to 8, wherein the crystallization in (i.b) is conducted under heating of the mixture provided in (i.a), wherein the mixture is preferably heated to a temperature in the range of from 80 to 220° C., preferably from 100 to 200° C., more preferably from 110 to 190° C., and even more preferably from 120 to 180° C.

10. The process of any of embodiments 2 to 9, wherein the crystallization in (i.b) is conducted for a period ranging from 0.1 to 50 d, preferably from 0.3 to 30 d, more preferably from 0.6 to 13 d, more preferably from 0.8 to 10 d, more preferably from 1 to 7 d, more preferably from 1.5 to 5 d, more preferably from 2 to 4.5 d, and even more preferably from 2.5 to 3.5 d.

11. The process of any of embodiments 2 to 10, wherein the crystallization in (i.b) is conducted under autogenous pressure, preferably in a pressure tight vessel, more preferably in an autoclave.

12. The process of any of embodiments 1 to 11, wherein the zeolitic material has a framework structure selected from the group consisting of BEA, CHA, EUO, FAU, FER, HEU, LEV, MEL, MFI, MOR, MTN, MWW, and TON, including mixed structures of two or more thereof, more preferably from the group consisting of BEA, CHA, EUO, FAU, FER, LEV, MFI, MOR, MTN, MWW, and TON, including mixed structures of two or more thereof, more preferably from the group consisting of BEA, CHA, LEV, MFI, MWW, including mixed structures of two or more thereof, wherein more preferably the zeolitic material has a CHA framework structure.

13. The process of any of embodiments 1 to 12, wherein Y is selected from the group consisting of Si, Sn, Ti, Zr, Ge, and mixtures of two or more thereof, Y preferably being Si and/or Ti, more preferably Si.

14. The process of any of embodiments 2 to 13, wherein the source for $YO_2$ provided in (i.a) comprises one or more compounds selected from the group consisting of silicas, silicates, silicic acid, and combinations of two or more thereof, preferably selected from the group consisting of silicas, alkali metal silicates, silicic acid, and combinations of two or more thereof, more preferably from the group consisting of fumed silica, colloidal silica, reactive amorphous solid silica, silica gel, pyrogenic silica, lithium silicates, sodium silicates, potassium silicates, silicic acid, and combinations of two or more thereof, more preferably from the group consisting of fumed silica, silica gel, pyrogenic silica, sodium silicates, silicic acid, and combinations of two or more thereof, more preferably from the group consisting of fumed silica, silica gel, pyrogenic silica, and combinations of two or more thereof, wherein more preferably the source for $YO_2$ comprises fumed and/or pyrogenic silica, preferably fumed silica.

15. The process of any of embodiments 1 to 14, wherein X is selected from the group consisting of Al, B, In, Ga, and mixtures of two or more thereof, X preferably being Al and/or B, more preferably Al.

16. The process of any of embodiments 2 to 15, wherein the source for $X_2O_3$ optionally provided in (i.a) comprises one or more compounds selected from the group consisting of aluminum, aluminum alkoxides, alumina, aluminates, and combinations of two or more thereof, wherein preferably the source for $X_2O_3$ comprises an aluminate, more preferably sodium and/or potassium aluminate, and more preferably sodium aluminate.

17. The process of any of embodiments 2 to 16, wherein a source of $Z_2O_5$ is further provided in (i.a), wherein Z stands for a pentavalent element, wherein Z is preferably selected from the group consisting of P, As, Sb, Bi, V, Nb, Ta, and combinations of two or more thereof, preferably from the group consisting of P, As, V, and combinations of two or more thereof, wherein more preferably Z is P and/or As, preferably P.

18. The process of any of embodiments 2 to 17, wherein the mixture prepared in (i.a) and crystallized in (i.b) contains 5 wt.-% or less of Na and/or K, preferably of Na based on 100 wt.-% of $YO_2$ contained in the mixture prepared in (i.a), preferably 3 wt.-% or less, more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, more preferably 0.005 wt.-% or less, more preferably 0.001 wt.-% or less of Na and/or K, preferably Na based on 100 wt.-% of $YO_2$ contained in the mixture prepared in (i.a).

19. The process of any of embodiments 1 to 18, wherein the average particle size D50 of the powder particles and/or of the droplets from the suspension in the aerosol obtained in (ii) as determined according to ISO 13320:2009 is in the range of from 0.5 to 500 μm, preferably of from 1 to 300 μm, preferably of from 5 to 200 μm, more preferably of from 10 to 150 μm, more preferably of from 12 to 100 μm, more preferably of from 15 to 80 μm, more preferably of from 18 to 60 μm, and more preferably of from 20 to 50 μm.

20. The process of any of embodiments 1 to 19, wherein atomization of the suspension of the zeolitic material in (ii) is conducted with a spray nozzle.

21. The process of any of embodiments 1 to 20, wherein the atomization of the powder of the zeolitic material in (ii) is conducted by introducing the powder into a gas stream, preferably with a screw feeder and/or with a vibrating chute.

22. The process of any of embodiments 1 to 21, wherein the gas stream comprises one or more of the gases selected from the group consisting of oxygen, nitrogen, carbon dioxide, carbon monoxide, helium, neon, argon, steam, air, and combinations of two or more thereof, preferably from the group consisting of oxygen, nitrogen, carbon dioxide, argon, steam, air, and combinations of two or more thereof.

23. The process of any of embodiments 1 to 22, wherein the temperature of the calcination in (iii) is in the range of from 500 to 1500 K, preferably of from 600 to 1400 K, more preferably of from 700 to 1300 K, more preferably of from 850 to 1200 K, more preferably from 900 to 1100 K, and more preferably of from 950 to 1050 K.

24. The process of any of embodiments 1 to 23, wherein the duration of the calcination in (iii) is in the range of from 5 ms to 30 s, preferably of from 20 ms to 15 s, more preferably of from 50 ms to 10 s, more preferably of from 200 ms to 8 s, more preferably of from 500 ms to 5 s, more preferably of from 1 to 3 s, and more preferably of from 1.5 to 2.5 s.

25. The process of any of embodiments 1 to 24, wherein calcination in (iii) is at least in part or entirely conducted in an oxygen containing atmosphere, wherein the oxygen content of the atmosphere in vol.-% based on the total volume of the gases therein is preferably in the range of from 1 to 100 vol.-%, more preferably from 3 to 80 vol.-%, more preferably from 5 to 50 vol.-%, more preferably from 10 to 40 vol.-%, more preferably from 15 to 30 vol.-%, more preferably from 18 to 25 vol.-%, and more preferably from 20 to 22 vol.-%.

26. The process of any of embodiments 1 to 25, wherein calcination in (iii) is at least in part or entirely conducted in an inert gas atmosphere, wherein the inert gas atmosphere preferably comprises nitrogen and/or one or more noble gases, wherein more preferably the inert gas atmosphere comprises one or more gases selected from the group consisting of nitrogen, helium, neon, argon, krypton, xenon, and mixtures of two or more thereof, more preferably from the group consisting of nitrogen, helium, argon, and mixtures of two or more thereof, more preferably from the group consisting of nitrogen, argon, and mixtures thereof, wherein more preferably the inert gas atmosphere comprises nitrogen, and wherein more preferably the inert gas atmosphere consists of nitrogen.

27. The process of any of embodiments 1 to 26, wherein calcination in (iii) is at least in part or entirely conducted in an atmosphere with a low oxygen content, wherein the oxygen content of the atmosphere in vol.-% based on the total volume of the gases therein is in the range of from 0.1 to 20 vol.-%, preferably of from 0.3 to 18 vol.-%, more preferably from 0.5 to 15 vol.-%, more preferably from 1 to 12 vol.-%, more preferably from 2 to 10 vol.-%, more preferably from 3 to 8 vol.-%, and more preferably from 4.5 to 5.5 vol.-%.
28. The process of any of embodiments 1 to 27, wherein calcination in (iii) is achieved by contacting the aerosol with a hot gas stream, wherein preferably the hot gas stream is generated by heating a gas stream with a heating element, wherein the gas stream is preferably a gas stream according to embodiment 22, and wherein the heating element is preferably a flame and/or an electrically heating element.
29. The process of any of embodiments 1 to 28, wherein the process is repeated one or more times, preferably 1 to 10 times, more preferably 1 to 5 times, more preferably 1 to 3 times, more preferably once or twice, and more preferably once.
30. The process of any of embodiments 1 to 29, wherein the process is not repeated but done in a single pass.
31. The process of any of embodiments 1 to 30, wherein the process further comprises one or more calcination steps performed in a kiln, preferably in a rotary kiln, wherein preferably prior to step (ii) the powder provided in (i) is subject to one or more calcination steps performed in a kiln, preferably in a rotary kiln, and/or the calcined powder obtained in (iii) is subject to one or more calcination steps performed in a kiln, preferably in a rotary kiln.
32. A zeolitic material obtainable and/or obtained according to the process of any of embodiments 1 to 31.
33. The zeolitic material of embodiment 32, wherein the average particle size D50 of the zeolitic material determined according to ISO 13320:2009 is in the range of from 0.5 to 500 μm, preferably of from 1 to 300 μm, preferably of from 5 to 200 μm, more preferably of from 10 to 150 μm, more preferably of from 12 to 100 μm, more preferably of from 15 to 80 μm, more preferably of from 18 to 60 μm, and more preferably of from 20 to 50 μm.
34. The zeolitic material of embodiment 32 or 33, wherein the crystallinity of the zeolitic material is in the range of from 30 to 100%, preferably from 50 to 98%, more preferably from 60 to 97%, more preferably from 70 to 96%, more preferably from 80 to 95%, more preferably from 85 to 94%, and more preferably from 88 to 93%.
35. The zeolitic material of any of embodiments 32 to 34, wherein the zeolitic material is obtained according to the process of any of embodiments 6 to 31, wherein the carbon content has been reduced by from 30 to 100% based on the carbon content of the uncalcined zeolitic material, wherein preferably, the carbon content has been reduced by from 50 to 100%, more preferably from 60 to 100%, more preferably from 70 to 100%, more preferably from 80 to 100%, more preferably from 90 to 100%, more preferably from 95 to 100%, more preferably from 98 to 100%, more preferably from 99 to 100%, more preferably from 99.5 to 100%, and more preferably from 99.9 to 100%.
36. Use of a zeolitic material according to any of embodiments 32 to 35 as a molecular sieve, as an adsorbent, for ion-exchange, as a catalyst, and/or as a catalyst support.

EXAMPLES

Example: Flash Calcination

Chabazite obtained from templated synthesis using 1-adamantyltrimethyl ammonium hydroxide and which was not subject to a treatment for removal of the adamantly template beforehand (Elemental analysis: 13.6 wt.-% C, 2.5 wt.-% Al, 35 wt.-% Si, and 0.34 wt.-% Na) was continually dispersed into a gas stream (air) with the aid of a brush activated dust dosage device. The dispersion rate was chosen such, that 10 g/h of the chabazite were dispersed in either 1 or 2.6 kg/h of air, depending on the specific experiment.

The reactor, consisting of a walled-in ceramic tube, was directly heated by a burner fueled with ethylene which is placed at the entrance of the tube. The average reactor temperature was adjusted by controlling the flow of ethylene and secondary air and eventually oxygen gas to the burner, as well as by controlling the flow of air and zeolite-containing gas streams through the reactor. The average time of retention of the zeolite product in the reactor was calculated based on the rate of flow of the respective gases.

The zeolite aerosol was thus fed into the directly heated reactor, wherein the flash-calcined zeolite product was quenched at the reactor tube outlet to temperatures below 200° C. The quenched material was then separated from the gas stream exiting the reactor via filtration.

The flash-calcined product thus obtained was then analyzed with respect to its crystallinity via X-ray diffraction techniques, as well as with respect to the levels of remaining organic content via elemental analysis.

A total of 10 test runs were conducted in this manner. As test run 11, the flash-calcined products obtained from test runs 1 and 2 were united and the test run was repeated for obtaining a flash-calcined product exposed to two flash calcination steps. Finally, as test run 12, a sample of the chabazite was suspended in polyethylene glycol, which was then sprayed into the reactor.

The conditions employed for the respective test runs are displayed in Table 1 below. Analysis of the resulting flash-calcined products from the test runs are displayed in Table 2 below, wherein the C-, Al-, and Si-content of the products has been determined via elemental analysis and the crystallinity grade as well as the size of the primary crystallites has been determined via X-ray diffraction, respectively. The crystallinity was determined according to the method as described in the User Manual DIFFRAC.EVA Version 3, page 105, from Bruker AXS GmbH, Karlsruhe (published February 2003). The respective data were collected on a standard Bruker D8 Advance Diffractometer Series II using a LYNXEYE detector, from 2° to 50° 2theta, using fixed slits, a step size of 0.02° 2theta and a scan speed of 2.4 s/step. The parameters used for estimating the background/amorphous content were Curvature=0 and Threshold=0.8.

TABLE 1

Reactor and flash calcination parameters.

| test run # | dispersion gas (air) zeolite [kg/h] | air feed reactor [kg/h] | air feed burner [kg/h] | oxygen feed burner [kg/h] | ethylene feed burner [kg/h] | lambda-value burner | reactor temperature [K] | retention time [ms] |
|---|---|---|---|---|---|---|---|---|
| 1 | 1 | 6.1 | 1.7 | — | 0.3 | 0.6 | 1145.15 | 60 |
| 2 | 1 | 6.5 | 1.9 | — | 0.3 | 0.6 | 1117.15 | 58 |
| 3 | 1 | 5 | 4.3 | — | 0.2 | 2.1 | 868.15 | 94 |
| 4 | 1 | 6.5 | 3.1 | — | 0.2 | 1.5 | 788.15 | 83 |
| 5 | 1 | 6.5 | 3.6 | — | 0.25 | 1.4 | 945.65 | 69 |
| 6 | 1 | 6.5 | 3.7 | — | 0.29 | 1.2 | 944.15 | 69 |
| 7 | 2.6 | 6.5 | 3.7 | — | 0.38 | 1.0 | 1080.65 | 49 |
| 8 | 2.6 | 6.5 | 3.7 | — | 0.5 | 0.7 | 1306.65 | 40 |
| 9 | 2.6 | 4.1 | 4.0 | — | 0.45 | 0.9 | 1363.15 | 52 |
| 10 | 2.6 | 0.6 | 1.1 | 0.4 | 0.31 | 0.8 | 1345.65 | 98 |
| 11 | 2.6 | 0.6 | 1.1 | 0.62 | 0.32 | 1.0 | 1345.65 | 160 |
| 12 | — | — | — | — | — | — | 1373.15 | — |

TABLE 2

Results of analytics performed on the flash-calcined products.

| test run # | elemental analysis [wt.-%] | | | crystal- linity [%] | average size of crystallites [nm] |
|---|---|---|---|---|---|
| | C | Al | Si | | |
| 1 | 5.5 | 2.4 | 37 | 70 | 72 |
| 2 | 5.5 | 2.4 | 37.5 | 67 | 73 |
| 3 | 8.4 | 2.4 | 36 | 90 | 71 |
| 4 | 9.5 | 2.3 | 36 | 77 | 71 |
| 5 | 10.2 | 2.1 | 35 | 82 | 72 |
| 6 | 8.9 | 2.2 | 36 | 75 | 73 |
| 7 | 8 | 2.2 | 36 | 71 | 72 |
| 8 | 7.1 | 2.2 | 37 | 65 | 70 |
| 9 | 5.8 | 2.3 | 38 | 56 | 67 |
| 10 | 5.5 | 2.4 | 38 | 55 | 62.5 |
| 11 | 4 | 2.6 | 40 | 43 | 60 |
| 12 | 6.2 | 3.3 | 35 | — | — |

Thus, as may be taken from the results from the flash calcination testing displayed in Table 2, it has surprisingly been found that despite the extremely short retention time ranging from 40 to 160 ms (see Table 1), from 29 to 75% of the organotemplate present in the zeolitic material may effectively be removed by the flash calcination process. This is particularly unexpected in the present case due to the considerable size and volume of the adamantyl-based organotemplate used. Furthermore, despite the fact that the calcination is performed at comparatively high temperatures, the crystallinity of the zeolitic material is well maintained.

Therefore, it has quite unexpectedly been found that the organotemplate present in a zeolitic material after synthesis thereof may be removed in a highly efficient manner, in particular with respect to the time and cost of calcination. This contrasts strongly to conventional methods which involve the heating of the material at high temperatures typically in the range of from 500 to 650° C. for several hours. Furthermore, as may be taken from the results displayed in Table 2, variation of the reactor parameters allow for an optimization of the results, in particular with respect to low carbon-content and high crystallinity of the resulting materials depending on the intended use thereof. Yet further optimization may for example be achieved by first admixing the zeolitic material with a solvent, wherein the suspension is then sprayed into the reactor such as demonstrated in test run #12 wherein the zeolitic material was suspended in polyethylene glycol.

In addition to the aforementioned, the inventive process offers further considerable advantages compared to conventional methods involving the heating of zeolitic materials at elevated temperatures for extended periods of time in that a far better control of the reactor environment may be achieved such that hot spots or the like may for example be avoided. Furthermore the realization of extremely short retention periods help to avoid negative effects on the structure of the material such as dealumination, which typically occurs by prolonged exposure to elevated temperatures under conventional calcination conditions. The inventive process is particularly adapted to avoiding such unwanted effects since as opposed to conventional calcination methods which require the gradual heating of the zeolitic material due to the limitations of convective heat transfer in accumulated materials subject to agglomeration, the inventive process allows for extremely rapid and precise heating and cooling phases of the highly dispersed materials. In addition to this, the high state of dispersion allows for further extremely rapid interactions with the environment in the reactor due to the maximized accessible surface area of the zeolitic material, such that access of gases and in particular of reactive gases such as oxygen to the surface of the zeolite particles in the aerosols employed is optimal. This equally applies with respect to the degradation and/or combustion products exiting the zeolitic materials, of which the effective diffusion rate out of the zeolite is highly increased due to the fact that their concentration in the vicinity of the surface of the zeolitic material may be kept low.

Consequently, the inventive process offers a variety of parameters for adapting the flash calcination process to the particular combination of zeolite and organotemplate to be treated, thus allowing for a high versatility with respect to the materials used as well as for very high degrees of optimization with respect to the results achieved which may by no means be reached by conventional calcination methods.

The invention claimed is:

1. A process for calcining a zeolitic material, the process comprising:
   (i) providing a zeolitic material comprising $YO_2$ and $X_2O_3$ in its framework structure in a form of a powder and/or of a suspension of the zeolitic material in a liquid, wherein Y is a tetravalent element and X is a trivalent element;

(ii) atomizing the powder and/or of the suspension of the zeolitic material in a gas stream for obtaining an aerosol; and (iii) calcining the aerosol, thereby obtaining a calcined powder, wherein X is Al.

2. The process of claim 1, wherein the providing comprises:

(i.a) preparing a mixture comprising a source for $YO_2$ and a solvent system, wherein the mixture optionally further comprises a source for $X_2O_3$; and (i.b) crystallizing the mixture for obtaining a suspension of a zeolitic material in a mother liquor as the suspension of the zeolitic material in a liquid.

3. The process of claim 2, wherein the providing further comprises:

(i.c) separating the zeolitic material from the mother liquor;

(i.d) optionally washing the zeolitic material obtained in (i.b) and/or (i.c) with at least one solvent; and (i.e) optionally drying the zeolitic material obtained in (i.b), (i.c) and/or (i.d).

4. The process of claim 3, wherein the providing further comprises:

(i.f) providing a solvent system; and (i.g) suspending the zeolitic material in the form of a powder as obtained according to (i.c), (i.d) and/or (i.e) in the solvent system.

5. The process of claim 4, wherein the solvent system comprises water and/or at least one organic solvent.

6. The process of claim 2, wherein the zeolitic material in the mother liquor is spray-dried.

7. The process of claim 2, wherein the mixture further comprises an organotemplate.

8. The process of claim 2, wherein the solvent system comprises water and/or at least one organic solvent.

9. The process of claim 1, wherein Y is at least one selected from the group consisting of Si, Sn, Ti, Zr, and Ge.

10. The process of claim 1, wherein an average particle size D50 of powder particles and/or of droplets from the suspension in the aerosol as determined according to ISO 13320:2009 is from 0.5 to 500 μm.

11. The process of claim 1, wherein the calcining is performed for from 5 ms to 30 s.

12. The process of claim 1, wherein the calcining is conducted in an oxygen containing atmosphere.

13. A zeolitic material obtained according to the process of claim 1.

14. The zeolitic material of claim 13, wherein an average particle size D50 of the zeolitic material determined according to ISO 13320:2009 is from 0.5 to 500 μm.

* * * * *